(12) United States Patent
Machacek et al.

(10) Patent No.: US 8,048,252 B2
(45) Date of Patent: *Nov. 1, 2011

(54) METHOD AND APPARATUS FOR CONCURRENT WELDING AND EXCISE OF BATTERY SEPARATOR

(75) Inventors: Paul Machacek, Oakdale, MN (US); Adam J. Morgan, Richfield, MN (US); Benjamin J. Haasl, Forest Lake, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,726

(22) Filed: May 10, 2010

(65) Prior Publication Data

US 2010/0218368 A1    Sep. 2, 2010

Related U.S. Application Data

(62) Division of application No. 11/126,943, filed on May 11, 2005, now Pat. No. 7,718,027.

(51) Int. Cl.
*B32B 37/00* (2006.01)
(52) U.S. Cl. .................. 156/251; 156/274.4; 156/275.1
(58) Field of Classification Search .................. 156/250, 156/251, 272.2, 274.4, 275.1
See application file for complete search history.

(56) References Cited

U.S. PATENT DOCUMENTS

| 3,389,311 A | 6/1968 | Rayno |
| 3,805,014 A | 4/1974 | Becker |
| 3,907,599 A | 9/1975 | Fanciullo et al. |
| 4,028,479 A | 6/1977 | Fanciullo et al. |
| 4,169,003 A | 9/1979 | Dangel et al. |
| 4,232,099 A | 11/1980 | Sullivan |
| 4,267,565 A | 5/1981 | Puppolo et al. |
| 4,659,636 A | 4/1987 | Suzuki et al. |
| 4,964,877 A | 10/1990 | Keister et al. |
| 5,147,737 A | 9/1992 | Post et al. |
| 5,229,223 A | 7/1993 | Hyland |

(Continued)

FOREIGN PATENT DOCUMENTS

EP    0224733 A1    6/1987

(Continued)

OTHER PUBLICATIONS

"U.S. Appl. No. 10/360,551, Decision on Appeal mailed Aug. 28, 2008", 7 pgs.

(Continued)

*Primary Examiner* — James Sells
(74) *Attorney, Agent, or Firm* — Schwegman, Lundberg & Woessner, P.A.

(57) ABSTRACT

The present subject matter relates to a method which includes positioning a bottom and top polymeric separator sheet on a working surface, with a substantially planar battery anode disposed therebetween; applying a pressure and an electrical current to a cutting and welding tool such that top and bottom polymeric separator sheets are welded into a bag and such that the bag is excised from the top and bottom separator sheets, with the battery anode disposed in the bag; stacking the battery anode and at least one cathode into a battery stack; and disposing the battery stack into a battery case having at least one feedthrough, with a first terminal connected to the battery stack through the at least one feedthrough, and with the battery case filled with an electrolyte, wherein the protrusion is defined by laser cutting the cutting and welding tool, machining the cutting and welding tool, or photochemical etching the cutting and welding tool.

20 Claims, 4 Drawing Sheets

U.S. PATENT DOCUMENTS

| | | | |
|---|---|---|---|
| 5,250,373 A | 10/1993 | Muffoletto et al. |
| 5,312,458 A | 5/1994 | Muffoletto et al. |
| 5,422,200 A | 6/1995 | Hope et al. |
| 5,451,286 A | 9/1995 | Nyborg |
| 5,458,997 A | 10/1995 | Crespi et al. |
| 5,468,569 A | 11/1995 | Pyszczek et al. |
| 5,486,215 A | 1/1996 | Kelm et al. |
| 5,549,717 A | 8/1996 | Takeuchi et al. |
| 5,628,801 A | 5/1997 | MacFarlane et al. |
| 5,691,079 A | 11/1997 | Daugaard |
| 5,705,292 A | 1/1998 | Yukita |
| 5,754,394 A | 5/1998 | Evans et al. |
| 5,790,368 A | 8/1998 | Naito et al. |
| 5,814,082 A | 9/1998 | Fayram et al. |
| 5,855,995 A | 1/1999 | Haq et al. |
| 5,867,363 A | 2/1999 | Tsai et al. |
| 5,882,362 A | 3/1999 | Muffoletto et al. |
| 5,908,151 A | 6/1999 | Elias |
| 5,916,335 A | 6/1999 | Gerhardt |
| 5,922,215 A | 7/1999 | Pless et al. |
| 5,926,357 A | 7/1999 | Elias et al. |
| 5,930,109 A | 7/1999 | Fishler |
| 5,963,418 A | 10/1999 | Greenwood, Jr. et al. |
| 5,983,472 A | 11/1999 | Fayram et al. |
| 6,004,692 A | 12/1999 | Muffoletto et al. |
| 6,006,133 A | 12/1999 | Lessar et al. |
| 6,009,348 A | 12/1999 | Rorvick et al. |
| 6,040,082 A | 3/2000 | Haas et al. |
| 6,042,624 A | 3/2000 | Breyen et al. |
| 6,118,651 A | 9/2000 | Mehrotra et al. |
| 6,118,652 A | 9/2000 | Casby et al. |
| 6,139,986 A | 10/2000 | Kurokawa et al. |
| 6,162,264 A | 12/2000 | Miyazaki et al. |
| 6,225,778 B1 | 5/2001 | Hayama et al. |
| 6,233,135 B1 | 5/2001 | Farahmandi et al. |
| 6,297,943 B1 | 10/2001 | Carson |
| 6,402,793 B1 | 6/2002 | Miltich et al. |
| 6,475,665 B1 | 11/2002 | Okamoto |
| 6,508,901 B2 | 1/2003 | Miller et al. |
| 6,509,588 B1 | 1/2003 | O'Phelan et al. |
| 6,522,525 B1 | 2/2003 | O'Phelan et al. |
| 6,556,863 B1 | 4/2003 | O'Phelan et al. |
| 6,571,126 B1 | 5/2003 | O'Phelan et al. |
| 6,674,634 B2 | 1/2004 | O'Phelan et al. |
| 6,684,102 B1 | 1/2004 | O'Phelan et al. |
| 6,687,118 B1 | 2/2004 | O'Phelan et al. |
| 6,699,265 B1 | 3/2004 | O'Phelan et al. |
| 6,709,946 B2 | 3/2004 | O'Phelan et al. |
| 6,777,129 B2 | 8/2004 | Komori |
| 6,819,544 B1 | 11/2004 | Nielsen et al. |
| 6,833,987 B1 | 12/2004 | O'Phelan |
| 6,881,516 B2 | 4/2005 | Aamodt et al. |
| 6,885,548 B2 | 4/2005 | Nyberg |
| 6,885,887 B2 | 4/2005 | O'Phelan et al. |
| 6,957,103 B2 | 10/2005 | Schmidt et al. |
| 6,985,351 B2 | 1/2006 | O'Phelan et al. |
| 7,000,665 B2 | 2/2006 | Parker et al. |
| 7,089,982 B2 | 8/2006 | Barr et al. |
| 7,107,099 B1 | 9/2006 | O'Phelan et al. |
| 7,120,008 B2 | 10/2006 | Sherwood |
| 7,135,254 B2 | 11/2006 | Yun et al. |
| 7,166,390 B2 | 1/2007 | Hamada |
| 7,180,727 B2 | 2/2007 | Poplett |
| 7,190,570 B2 | 3/2007 | Schmidt et al. |
| 7,221,556 B2 | 5/2007 | Schmidt et al. |
| 7,224,575 B2 | 5/2007 | Sherwood |
| 7,355,841 B1 | 4/2008 | Schmidt et al. |
| 7,456,077 B2 | 11/2008 | Sherwood et al. |
| 7,479,349 B2 | 1/2009 | O'Phelan et al. |
| 7,718,027 B2 | 5/2010 | Machacek et al. |
| 7,901,808 B2 | 3/2011 | Morgan et al. |
| 2001/0020319 A1 | 9/2001 | Farahmandi et al. |
| 2002/0124949 A1 | 9/2002 | Fukuda et al. |
| 2003/0077509 A1 | 4/2003 | Probst et al. |
| 2003/0129488 A1 | 7/2003 | Gross |
| 2003/0195568 A1 | 10/2003 | O'Phelan et al. |
| 2004/0019268 A1 | 1/2004 | Schmidt et al. |
| 2004/0114311 A1 | 6/2004 | O'Phelan et al. |
| 2004/0115530 A1 | 6/2004 | Maeda |
| 2004/0127952 A1 | 7/2004 | O'Phelan et al. |
| 2004/0147960 A1 | 7/2004 | O'Phelan et al. |
| 2004/0147961 A1 | 7/2004 | O'Phelan et al. |
| 2004/0173835 A1 | 9/2004 | Schmidt et al. |
| 2004/0174658 A1 | 9/2004 | O'Phelan et al. |
| 2004/0193221 A1 | 9/2004 | O'Phelan et al. |
| 2004/0215281 A1 | 10/2004 | O'Phelan et al. |
| 2004/0258986 A1 | 12/2004 | Shen |
| 2005/0010253 A1 | 1/2005 | O'Phelan et al. |
| 2005/0017888 A1 | 1/2005 | Sherwood et al. |
| 2005/0031947 A1 | 2/2005 | Yamada |
| 2005/0052825 A1 | 3/2005 | O'Phelan |
| 2005/0058896 A1 | 3/2005 | Nomura et al. |
| 2005/0061426 A1 | 3/2005 | Parker et al. |
| 2005/0154423 A1 | 7/2005 | Goedeke et al. |
| 2005/0221171 A1 | 10/2005 | Haasl et al. |
| 2006/0009808 A1 | 1/2006 | Schmidt et al. |
| 2006/0012942 A1 | 1/2006 | Poplett |
| 2006/0081328 A1 | 4/2006 | Parker et al. |
| 2006/0107506 A1 | 5/2006 | Doffing et al. |
| 2006/0152887 A1 | 7/2006 | Schmidt et al. |
| 2006/0247715 A1 | 11/2006 | Youker |
| 2006/0254705 A1 | 11/2006 | Machacek et al. |
| 2006/0257726 A1 | 11/2006 | Kelley et al. |
| 2006/0286453 A1 | 12/2006 | Nakagawa |
| 2007/0099071 A1 | 5/2007 | Morgan et al. |
| 2008/0030928 A1 | 2/2008 | Schmidt et al. |

FOREIGN PATENT DOCUMENTS

| | | |
|---|---|---|
| EP | 0854529 A1 | 7/1998 |
| EP | 0994518 A1 | 4/2000 |
| WO | WO-00/19470 A1 | 4/2000 |
| WO | WO-02/43090 A2 | 5/2002 |
| WO | WO-0237515 A2 | 5/2002 |
| WO | WO-0243090 A2 | 5/2002 |
| WO | WO-2006002148 A1 | 1/2006 |

OTHER PUBLICATIONS

"U.S. Appl. No. 11/126,943, Examiner Interview Summary mailed Aug. 20, 2009", 4 pgs.

"U.S. Appl. No. 11/126,943, Non-Final Office Action mailed Apr. 1, 2009", 6 pgs.

"U.S. Appl. No. 11/126,943, Notice of Allowance mailed Jan. 13, 2009", 7 pgs.

"U.S. Appl. No. 11/126,943, Notice of Allowance mailed Dec. 30, 2009", 7 pgs.

"U.S. Appl. No. 11/126,943, Response filed Sep. 1, 2009 to Non Final Office Action mailed Apr. 1, 2009", 9 pgs.

"U.S. Appl. No. 11/126,943, Response filed Oct. 21, 2008 to Restriction Requirement mailed Sep. 29, 2008", 7 pgs.

"U.S. Appl. No. 11/126,943, Restriction Requirement mailed Sep. 29, 2008", 6 pgs.

"U.S. Appl. No. 11/264,966, Notice of Allowance mailed Oct. 29, 2010", 7 pgs.

"U.S. Appl. No. 11/264,966, Response filed Aug. 16, 2010 to Non Final Office Action mailed Apr. 16, 2010", 12 pgs.

"U.S. Appl. No. 09/705,976, Non Final Office Action mailed Apr. 1, 2002", 12 pgs.

"U.S. Appl. No. 09/705,976, Notice of Allowance mailed Aug. 6, 2002", 5 pgs.

"U.S. Appl. No. 10/287,285, Response filed Jun. 27, 2003 to Non-Final Office Action mailed Feb. 27, 2003", 11 pgs.

"U.S. Appl. No. 10/299,234, Preliminary Amendment filed Nov. 19, 2002", 2 pgs.

"U.S. Appl. No. 10/299,234, Notice of Allowance mailed Sep. 25, 2003", 7 pgs.

"U.S. Appl. No. 10/360,551, Advisory Action mailed Jul. 7, 2006", 3 pgs.

"U.S. Appl. No. 10/360,551, Appeal Brief filed Feb. 14, 2007", 20 pgs.

"U.S. Appl. No. 10/360,551, Examiner's Answer mailed May 10, 2007", 10 pgs.

"U.S. Appl. No. 10/360,551, Final Office Action mailed Apr. 14, 2006", 8 pgs.

"U.S. Appl. No. 10/360,551, Non-Final Office Action mailed Jan. 6, 2006", 6 pgs.
"U.S. Appl. No. 10/360,551, Notice of Allowance mailed Sep. 11, 2008", 6 pgs.
"U.S. Appl. No. 10/360,551, Pre-Appeal Brief Request for Review filed Sep. 14, 2006", 5 pgs.
"U.S. Appl. No. 10/360,551, Reply Brief filed Jul. 10, 2007", 4 pgs.
"U.S. Appl. No. 10/360,551, Response filed Apr. 6, 2006 to non-Final Office Action mailed Jan. 6, 2006", 7 pgs.
"U.S. Appl. No. 10/360,551, Response filed Jun. 14, 2006 to Final Office Action mailed Apr. 14, 2006", 8 pgs.
"U.S. Appl. No. 10/360,551, Response filed Nov. 14, 2005 to Restriction Requirement mailed Oct. 14, 2005", 5 pgs.
"U.S. Appl. No. 10/360,551, Restriction Requirement mailed Oct. 14, 2005", 12 pgs.
"U.S. Appl. No. 10/413,680, Non-Final Office Action mailed May 21, 2004", 4 pgs.
"U.S. Appl. No. 10/413,680, Non-Final Office Action mailed Nov. 18, 2004", 5 pgs.
"U.S. Appl. No. 10/413,680, Notice of Allowance mailed May 3, 2005", 4 pgs.
"U.S. Appl. No. 10/413,680, Response filed Feb. 18, 2005 to Non-Final Office Action mailed Nov. 18, 2004", 9 pgs.
"U.S. Appl. No. 10/413,680, Response filed Aug. 23, 2004 to Non-Final Office Action mailed May 21, 2004", 9 pgs.
"U.S. Appl. No. 10/418,616, Non-Final Office Action mailed Aug. 12, 2003", 4 pgs.
"U.S. Appl. No. 10/418,616, Notice of Allowance mailed Feb. 27, 2004", 4 pgs.
"U.S. Appl. No. 10/418,616, Response filed Feb. 12, 2004 to Non Final Office Action mailed Aug. 12, 2003", 7 pgs.
"U.S. Appl. No. 10/637,604, Response filed Jan. 23, 2006 to Final Office Action mailed Nov. 22, 2005", 15 pgs.
"U.S. Appl. No. 10/637,604, Response filed Mar. 8, 2005 to Non Final Office Action mailed Dec. 8, 2004", 13 pgs.
"U.S. Appl. No. 10/637,604, Response filed Sep. 1, 2005 to Non Final Office Action mailed Jun. 1, 2005", 15 pgs.
"U.S. Appl. No. 10/637,604, Advisory Action mailed Feb. 13, 2006", 3 pgs.
"U.S. Appl. No. 10/637,604, Final Office Action mailed Nov. 22, 2005", 15 pgs.
"U.S. Appl. No. 10/637,604, Non-Final Office Action mailed Jun. 1, 2005", 14 pgs.
"U.S. Appl. No. 10/637,604, Non-Final Office Action mailed Dec. 8, 2004", 9 pgs.
"U.S. Appl. No. 10/637,604, Notice of Allowance mailed Mar. 20, 2006", 7 pgs.
"U.S. Appl. No. 10/729,424, Non Final Office Action mailed Oct. 4, 2004", 17 pgs.
"U.S. Appl. No. 10/729,424, Notice of Allowance mailed Feb. 4, 2005", 6 pgs.
"U.S. Appl. No. 10/729,424, Response filed Jan. 4, 2005 to Non-Final Office Action mailed Oct. 4, 2004", 10 pgs.
"U.S. Appl. No. 10/804,288, Preliminary Amendment filed Mar. 18, 2004", 5 pgs.
"U.S. Appl. No. 10/804,288, Notice of Allowance mailed Aug. 23, 2005", 9 pgs.
"U.S. Appl. No. 10/874,798, Advisory Action mailed Jan. 8, 2008", 3 pgs.
"U.S. Appl. No. 10/874,798, Final Office Action mailed Oct. 4, 2007 in", 7 pgs.
"U.S. Appl. No. 10/874,798, Non-Final Office Action filed Mar. 26, 2007", 7 pgs.
"U.S. Appl. No. 10/874,798, Non-Final Office Action mailed Sep. 19, 2006", 5 pgs.
"U.S. Appl. No. 10/874,798, Non-Final Office Action mailed Nov. 2, 2004", 7 pgs.
"U.S. Appl. No. 10/874,798, Notice of Allowance mailed Apr. 30, 2008", 6 pgs.
"U.S. Appl. No. 10/874,798, Notice of Allowance mailed Jul. 24, 2008", 4 pgs.
"U.S. Appl. No. 10/874,798, Response filed Jan. 25, 2005 to Non-Final Office Action mailed Nov. 2, 2004", 9 pgs.
"U.S. Appl. No. 10/874,798, Response filed Dec. 4, 2007 to Non-Final Office Action mailed Oct. 4, 2007", 6 pgs.
"U.S. Appl. No. 10/874,798, Response filed Dec. 19, 2006 to Non-Final Office Action mailed Sep. 19, 2006", 5 pgs.
"U.S. Appl. No. 10/882,144, Notice of Allowance mailed Dec. 14, 2004", 6 pgs.
"U.S. Appl. No. 11/117,952, Final Office Action mailed Apr. 24, 2008", 10 pgs.
"U.S. Appl. No. 11/117,952, Non-Final Office Action Mailed Sep. 25, 2007", 9 pgs.
"U.S. Appl. No. 11/117,952, Response filed Aug. 24, 2007 to Restriction Requirement mailed Jul. 24, 2007", 7 pgs.
"U.S. Appl. No. 11/117,952, Response filed Dec. 26, 2007 to Non-Final Office Action mailed Sep. 25, 2007", 9 pgs.
"U.S. Appl. No. 11/117,952, Restriction Requirement mailed Jul. 24, 2007", 6 pgs.
"U.S. Appl. No. 11/226,954, Response filed Aug. 17, 2006 to Non Final Office Action mailed May 17, 2006", 8 pgs.
"U.S. Appl. No. 11/226,954, Non-Final Office Action mailed May 17, 2006", 6 pgs.
"U.S. Appl. No. 11/226,954, Non-Final Office Action mailed Dec. 15, 2005", 12 pgs.
"U.S. Appl. No. 11/226,954, Notice of Allowance mailed Nov. 1, 2006", 4 pgs.
"U.S. Appl. No. 11/226,954, Response filed Mar. 15, 2006 to Non-Final Office Action mailed Dec. 15, 2005", 12 pgs.
"U.S. Appl. No. 11/264,966, Non-Final Office Action mailed Apr. 16, 2010", 7 pgs.
"U.S. Appl. No. 11/264,966, Response filed Mar. 8, 2010 to Restriction Requirement mailed Feb. 4, 2010", 9 pgs.
"U.S. Appl. No. 11/264,966, Response filed Nov. 20, 2009 to Restriction Requirement mailed Oct. 14, 2009", 9 pgs.
"U.S. Appl. No. 11/264,966, Restriction Requirement mailed Feb. 4, 2010", 6 pgs.
"U.S. Appl. No. 11/264,966, Restriction Requirement mailed Oct. 14, 2009", 8 pgs.
"U.S. Appl. No. 11/325,931, Non-Final Office Action mailed Jul. 21, 2006", 6 pgs.
"U.S. Appl. No. 11/325,931, Notice of Allowance mailed Jan. 16, 2007", 7 pgs.
"U.S. Appl. No. 11/325,931, Response filed Oct. 23, 2006 to Non-Final Office Action mailed Jul. 21, 2006", 9 pgs.
"U.S. Appl. No. 11/904,285, Response filed Nov. 11, 2008 to Final Office Action mailed Sep. 11, 2008", 6 pgs.
"U.S. Appl. No. 11/904,285, Response filed Jun. 12, 2008 to Non-Final Office Action mailed Mar. 12, 2008", 10 pgs.
"U.S. Appl. No. 11/904,285, Final Office Action mailed Sep. 11, 2008", 12 pgs.
"U.S. Appl. No. 11/904,285, Non-Final Office Action mailed Mar. 12, 2008", 11 pgs.
"U.S. Appl. No. 11/904,285, Non-Final Office Action mailed Nov. 25, 2008", 8 pgs.
"European Application Serial No. 03800396.8, Communication mailed Sep. 1, 2008", 4 pgs.
"International Application No. PCT/US2003/041704, Invitation to Pay Additional fees and Partial International Search mailed Jun. 10, 2005", 16 pgs.
"International Application No. PCT/US2005/021898, International Search Report mailed Mar. 11, 2005", 4 pgs.
"International Application Serial No. PCT/US01/45202, International Search Report mailed Feb. 21, 2003", 6 pgs.
"International Application Serial No. PCT/US2005.021898, International Preliminary Report on Patentability mailed Jan. 11, 2007", 7 pgs.
Ashenmacher, G E, "Clamping Mechanism", IBM Techical Disclosure Bulletin, 23 (9), NN81024261, (Feb. 1, 1981), 4261-4263.
Moynihan, J. D., "Theory, Design and Application of Electrolytic Capacitors", Theory, Design and Application of Electrolytic Capacitors, Copyright by John D. Moynihan, (1982), 139 pgs.
Shams, A. M, et al., "Titanium hydride formation from Arabian Gulf water", Desalination, vol. 107, (1996), 265-276.
"U.S. Appl. No. 09/705,976, Response filed Jul. 1, 2002 to Non Final Office Action mailed Apr. 1, 2002", 8 pgs.

"U.S. Appl. No. 09/705,994, Non Final Office Action mailed Sep. 11, 2002", 5 pgs.

"U.S. Appl. No. 09/705,994, Notice of Allowance mailed Dec. 26, 2002", 6 pgs.

"U.S. Appl. No. 09/705,994, Response filed Dec. 10, 2002 to Non Final Office Action mailed Sep. 11, 2002", 4 pgs.

"U.S. Appl. No. 09/706,519, Non Final Office Action mailed Apr. 24, 2002", 6 pgs.

"U.S. Appl. No. 09/706,519, Notice of Allowance mailed Aug. 26, 2002", 7 pgs.

"U.S. Appl. No. 09/706,519, Response filed Jul. 24, 2002 to Non Final Office Action mailed Apr. 24, 2002", 4 pgs.

"U.S. Appl. No. 09/706,576, Amendment and Response filed Jun. 12, 2003 to Notice of Non-Compliant Amendment mailed May 12, 2003", 12 pgs.

"U.S. Appl. No. 09/706,576, Final Office Action mailed Sep. 10, 2003", 5 pgs.

"U.S. Appl. No. 09/706,576, Final Office Action mailed Oct. 5, 2005", 7 pgs.

"U.S. Appl. No. 09/706,576, Non Final Office Action mailed Jan. 10, 2005", 7 pgs.

"U.S. Appl. No. 09/706,576, Non Final Office Action mailed Feb. 2, 2007", 7 pgs.

"U.S. Appl. No. 09/706,576, Non Final Office Action mailed Oct. 31, 2002", 8 pgs.

"U.S. Appl. No. 09/706,576, Notice of Allowance mailed Jul. 18, 2007", 5 pgs.

"U.S. Appl. No. 09/706,576, Notice of Allowance mailed Nov. 15, 2007", 6 pgs.

"U.S. Appl. No. 09/706,576, Notice of Non-Compliant Amendment mailed May 12, 2003", 2 pgs.

"U.S. Appl. No. 09/706,576, Response filed Apr. 30, 2003 to Non Final Office Action mailed Oct. 31, 2002", 12 pgs.

"U.S. Appl. No. 09/706,576, Response filed Jul. 2, 2007 to Non Final Office Action mailed Feb. 2, 2007", 5 pgs.

"U.S. Appl. No. 09/706,576, Response filed Jul. 11, 2005 to Non Final Office Action mailed Jan. 10, 2005", 12 pgs.

"U.S. Appl. No. 09/706,576, Response filed Oct. 12, 2004 to Final Office Action mailed Sep. 20, 2003", 10 pgs.

"U.S. Appl. No. 09/706,576, Response filed Nov. 6, 2006 to Final Office Action mailed Oct. 5, 2005", 6 pgs.

"U.S. Appl. No. 09/706,576, Supplemental Notice of Allowability Mailed Sep. 6, 2007", 4 pgs.

"U.S. Appl. No. 10/050,598, Non Final Office Action mailed Dec. 17, 2002", 8 pgs.

"U.S. Appl. No. 10/050,598, Notice of Allowance mailed Apr. 21, 2003", 7 pgs.

"U.S. Appl. No. 10/050,598, Response filed Mar. 17, 2003 to Non Final Office Action mailed Dec. 17, 2002", 9 pgs.

"U.S. Appl. No. 10/287,285, Non Final Office Action mailed Feb. 27, 2003", 8 pgs.

"U.S. Appl. No. 10/287,285, Notice of Allowance mailed Aug. 4, 2003", 7 pgs.

METHOD AND APPARATUS FOR CONCURRENT WELDING AND EXCISE OF BATTERY SEPARATOR

CROSS REFERENCE TO RELATED APPLICATION

This application is a divisional of U.S. application Ser. No. 11/126,943, filed May 11, 2005 now U.S. Pat. No. 7,718,027, which is hereby incorporated by reference in its entirety.

TECHNICAL FIELD

This disclosure relates generally to self-contained energy sources, and more particularly to method and apparatus for concurrent welding and excise of battery separator.

BACKGROUND

Energy storage components, such as batteries and capacitors, are used in a variety of electronic devices. As technology evolves, devices using these components consistently demand smaller component sizes. However, in meeting the demands of technology, these components cannot sacrifice performance. As such, the art requires energy storage components which are smaller, but which meet or exceed energy requirements.

In meeting these requirements, manufacturing improvements are needed. New manufacturing processes must manage new components efficiently, and reliably, enabling new configurations. To improve space efficiency, new manufacturing processes are needed to tailor components to their respective application. Hand tailoring of components, such as flexible sheets, can be labor intensive and time consuming. Thus a new automated system is needed which can efficiently tailor components for use. Further, what is needed is a tailoring system which is more reliable than hand tailoring.

SUMMARY

The above-mentioned problems and others not expressly discussed herein are addressed by the present subject matter and will be understood by reading and studying this specification.

One embodiment of the present subject matter relates to a method which includes positioning a bottom and top polymeric separator sheet on a working surface, with a substantially planar battery anode disposed therebetween; positioning a cutting and welding tool against the top polymeric sheet, the cutting and welding tool having an elongate surface with a protrusion extending away from the elongate surface and along the elongate surface, the elongate surface shaped for positioning offset from and outside of the perimeter of the substantially planar battery anode; applying a pressure and an electrical current to the cutting and welding tool such that top and bottom polymeric separator sheets are welded into a bag and such that the bag is excised from the top and bottom separator sheets, with the substantially planar battery anode disposed in the bag; stacking the substantially planar battery anode and at least one cathode into a battery stack; and disposing the battery stack into a battery case having at least one feedthrough, with a first terminal connected to the battery stack through the at least one feedthrough, and with the battery case filled with an electrolyte, wherein the protrusion is defined by laser cutting the cutting and welding tool.

Additionally, in one embodiment, the present subject matter relates to a method which includes positioning a bottom and top polymeric separator sheet on a working surface, with a substantially planar battery anode disposed therebetween; positioning a cutting and welding tool against the top polymeric sheet, the cutting and welding tool having an elongate surface with a protrusion extending away from the elongate surface and along the elongate surface, the elongate surface shaped for positioning offset from and outside of the perimeter of the substantially planar battery anode; applying a pressure and an electrical current to the cutting and welding tool such that top and bottom polymeric separator sheets are welded into a bag and such that the bag is excised from the top and bottom separator sheets, with the substantially planar battery anode disposed in the bag; stacking the substantially planar battery anode and at least one cathode into a battery stack; and disposing the battery stack into a battery case having at least one feedthrough, with a first terminal connected to the battery stack through the at least one feedthrough, and with the battery case filled with an electrolyte, wherein the protrusion is defined by machining the cutting and welding tool.

One embodiment of the present subject matter relates to a method which includes positioning a bottom and top polymeric separator sheet on a working surface, with a substantially planar battery anode disposed therebetween; positioning a cutting and welding tool against the top polymeric sheet, the cutting and welding tool having an elongate surface with a protrusion extending away from the elongate surface and along the elongate surface, the elongate surface shaped for positioning offset from and outside of the perimeter of the substantially planar battery anode; applying a pressure and an electrical current to the cutting and welding tool such that top and bottom polymeric separator sheets are welded into a bag and such that the bag is excised from the top and bottom separator sheets, with the substantially planar battery anode disposed in the bag; stacking the substantially planar battery anode and at least one cathode into a battery stack; and disposing the battery stack into a battery case having at least one feedthrough, with a first terminal connected to the battery stack through the at least one feedthrough, and with the battery case filled with an electrolyte, wherein the protrusion is defined by photochemical etching the cutting and welding tool.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Self-powered electronic devices are known. For example, self-powered implantable medical devices are now in use for treating a variety of diseases. Implantable pulse generation devices, as well as other types of implantable medical devices, are powered by a battery contained within the housing of the device, in various embodiments. The present subject matter discusses batteries suitable for use in implantable medical devices, as well as other devices requiring self-contained power.

Batteries include various subcomponents. For example, various battery embodiments include opposing anode and cathode plates. These electrode subcomponents, in various embodiments, are isolated by separator. In various embodiments, separator is porous to accommodate electrolyte adapted to sustain ionic transfer between the electrodes. In additional embodiments, the separator includes failsafe subcomponents intended to decrease breakdown by reducing or eliminating ionic transfer. For example, some embodiments include a meltable separator. Various separator embodiments include three layers of porous separator material, such that the center material melts and clogs the pores of the external layers, reducing or eliminating ionic transfer. To ensure that ionic transfer between the anode and the cathode is reduced, in some embodiments, the present subject matter includes separator bags enveloping the battery anode. Bag embodiments cover a large amount of ionic paths between anodes and cathodes. The present subject matter relates to construction of these bags, in various embodiments.

Figure 1A:
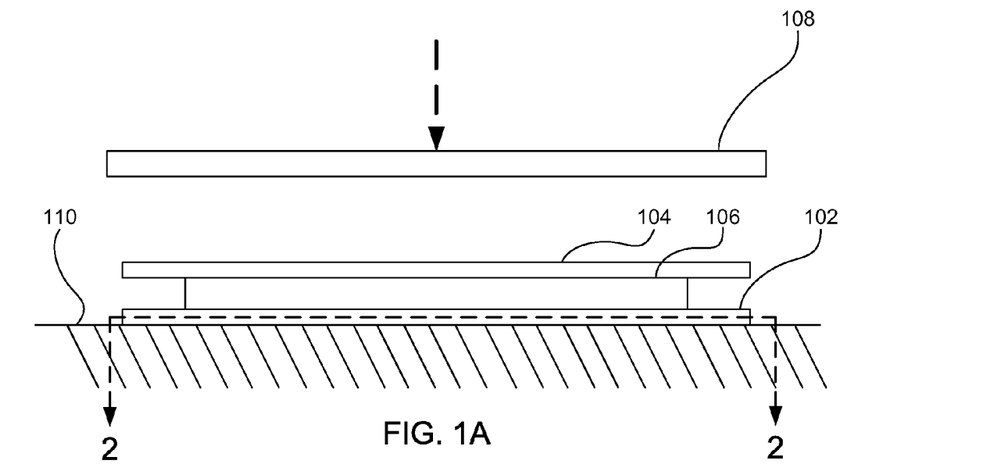
FIG. 1A is a front view of a system schematic for welding and cutting power source components, according to one embodiment of the present subject matter.

FIG. 1A is a front view of a system schematic for welding and cutting power source components, according to one embodiment of the present subject matter. In various embodiments, the system includes a cutting and welding tool 108, and a stack having a top polymeric separator sheet 104, an anode 106, and a bottom separator sheet 102. Although this embodiment includes an anode, other embodiments can include a cathode. In various embodiments, the bottom 102 and top 104 polymeric sheets include a microporous membrane having a polyethylene layer disposed between two polypropylene layers. Various embodiments include sheets available under the brand name CELGARD, a product of Celgard LLC, of Charlotte, N.C. 28273. Other sheets including additional materials, however, are included within the scope of the present subject matter.

In various embodiments, the battery anode includes lithium. The battery electrode, when viewed from the top, may have any shape, including rectangular shapes, circular shapes, or irregular shapes. Both the shape of the cross section and the top view profile shape of the electrode are provided for explanation, but other shapes are possible. In cathode embodiments, the cathodes include manganese dioxide.

The stack rests on a working surface 110, in various embodiments. The illustration shows that the cutting and welding tool is incident unto the stack. In various embodiments, the present subject matter includes positioning a cutting and welding tool 108 against the top polymeric sheet 104. In alternate embodiments, the cutting and welding tool is fixed to a first static working surface, and a second working surface sandwiches the top and bottom polymeric separator layers and anode between the cutting and welding tool and the second working surface. Additional fixtures are within the scope of the present subject matter.

Figure 1B:
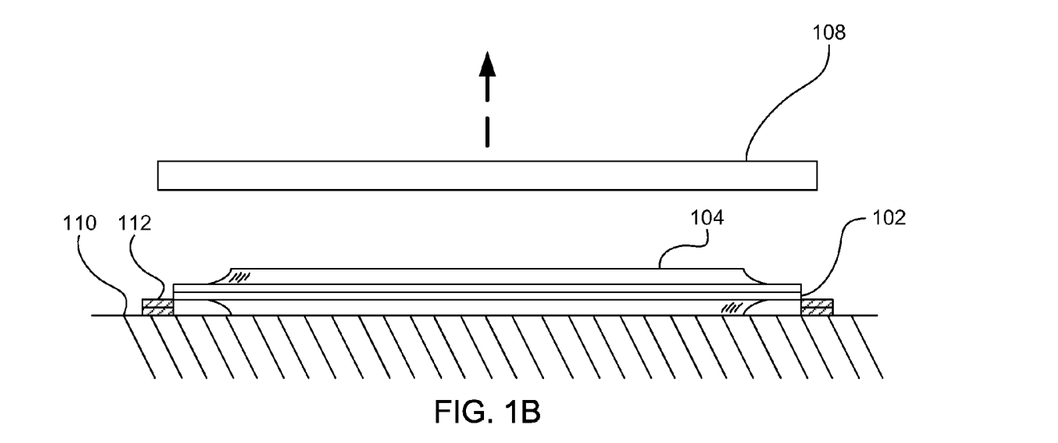
FIG. 1B is a front view of a system schematic for welding and cutting power source components, according to one embodiment of the present subject matter.

FIG. 1B is a front view of a system schematic for welding and cutting power source components, according to one embodiment of the present subject matter. The illustration shows components after processing with the cutting and welding tool 108. The illustration shows an anode welded between bottom 102 and top 104 polymeric separator sheets. The components rest on working surface 110. Scrap materials 112, from which the top and bottom separator layers are separated, are also illustrated.

Figure 2:
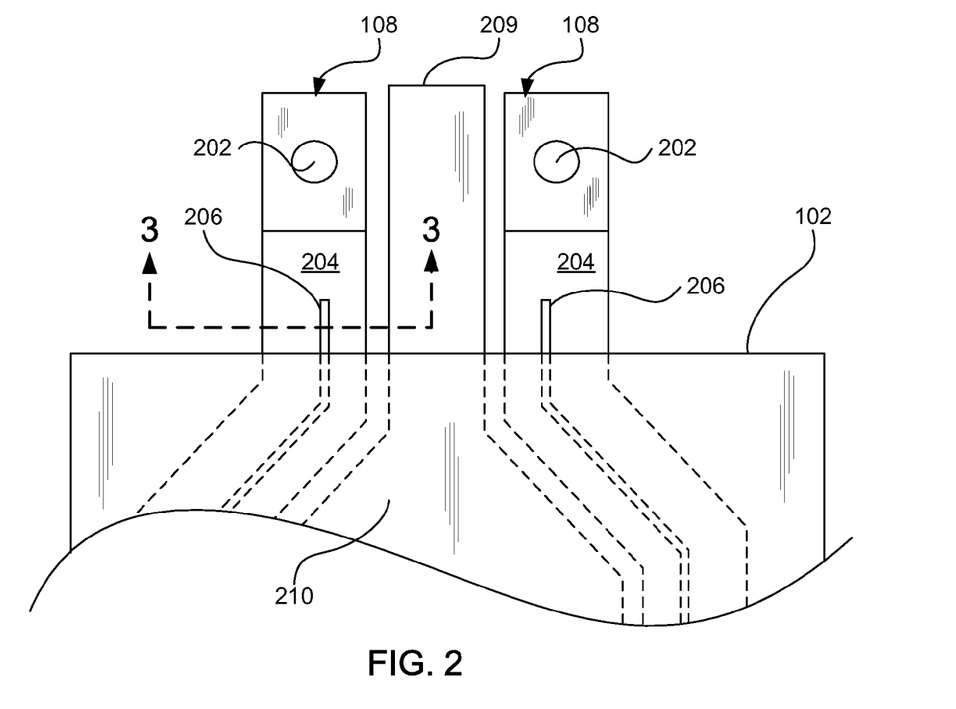
FIG. 2 is a partial bottom view of a cutting and welding tool, according to one embodiment of the present subject matter.

In various embodiments, the cutting and welding tool 108 has an elongate surface with a protrusion extending away from the elongate surface and along the elongate surface. FIG. 2 is a partial bottom view of a cutting and welding tool 108, taken at line "2" of FIG. 1, according to one embodiment of the present subject matter. Visible in the figure is a mounting eyelet 202. Visible are the elongate surface 204 and the protrusion 206. In various embodiments, the cutting and welding tool 108 is a thin ribbon-shaped band. In some embodiments, the cutting and welding tool 108 is substantially rigid. In various embodiments, the cutting and welding tool 108 is metallic.

Figure 3:
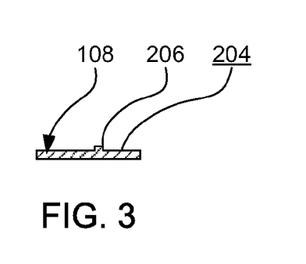
FIG. 3 is a cross section taken at line "3" of FIG. 2, according to one embodiment of the present subject matter.
Figure 4:
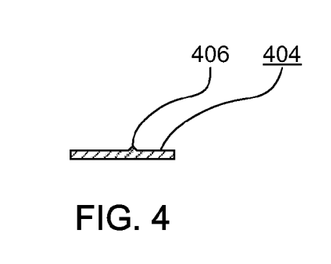
FIG. 4 is a cross section of a cutting and welding tool, according to one embodiment of the present subject matter.

FIG. 3 is a cross section taken at line "3" of FIG. 2, according to one embodiment of the present subject matter. Illustrated are the protrusion 206 and the elongate surface 204 of the cutting tool 108. In various embodiments, the protrusion is rectangular when viewed from a cross section. FIG. 4 is a cross section of a cutting and welding tool, according to one embodiment of the present subject matter. FIG. 4 demonstrates that the protrusion 406 has a triangular cross section, in various embodiments, bordered by elongate surface 404. In various embodiments, the width of the protrusion is a fraction of the width of the ribbon.

Referring again to FIG. 2, in various embodiments, the cutting and welding tool 108 is shaped for positioning offset from and outside of the perimeter of the battery anode 210. For example, when the anode is disposed between a top and bottom 102 sheet, the cutting surface is shaped such that it can press the sheets together by contacting the top sheet along an area around the anode 210. Contact between the cutting and welding tool 108 and the top sheet occurs proximal the elongate surface 204 and the protrusion 206. In various embodiments, an anode tab portion 209 of the battery anode extends outside the bag. Additional embodiments include alternate anode configurations and shapes also fall within the scope of the present subject matter.

Various embodiments of the present subject matter include applying a pressure and an electrical current to the cutting and welding tool 108 such that top and bottom 102 polymeric separator sheets are welded into a bag. For example, some embodiments define a weld extending around the battery anode proximal the elongate surface 204. The weld may form a circuit around the anode, or may partially surround the anode, in various embodiments. In various embodiments, the battery anode is disposed in the bag. Various embodiments also excise the bag from the top and bottom separator sheets. In various embodiments, the excise occurs proximal protrusion 206.

In various embodiments, the present subject matter uses a cutting and welding tool attached to a thermal impulse sealing fixture. One embodiment uses an HD-0 fixture manufactured by ALINE HEAT SEAL CORPORATION, of Cerritos, Calif. 90703. This fixture includes controllers manufactured by ROPEX of 74321 Bietigheim-Bissingen, Germany. Other fixtures and controllers are within the scope of the present subject matter. In various embodiments, the cutting and welding tool 108 is attached to a thermal impulse sealer at mounting eyelets 202. The duration and intensity of the heat are variable depending on the application, in various embodiments. Additionally, pressure used by the machine is variable and dependent on an application, in various embodiments.

Figure 5A:
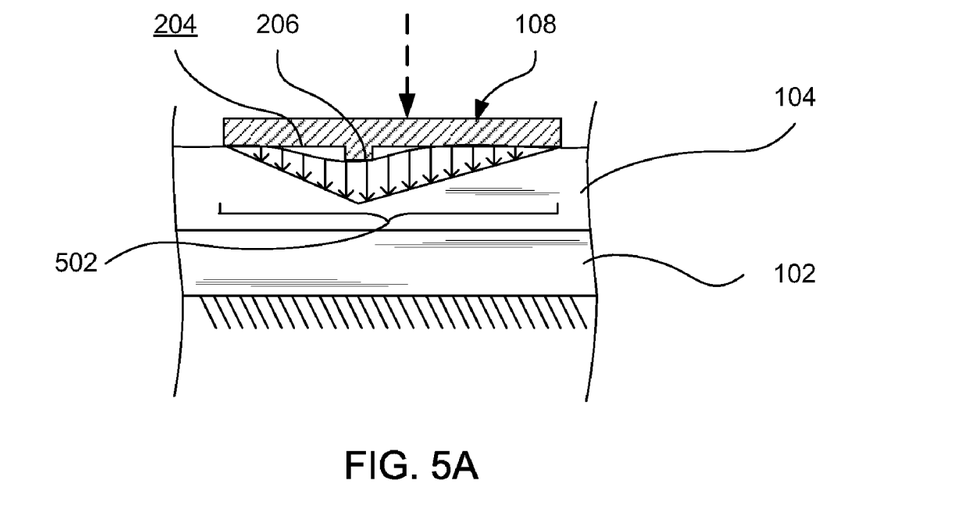
FIG. 5A shows a top and bottom separator sheet and a cross section of a cutting and welding tool, according to one embodiment of the present subject matter.
Figure 5B:
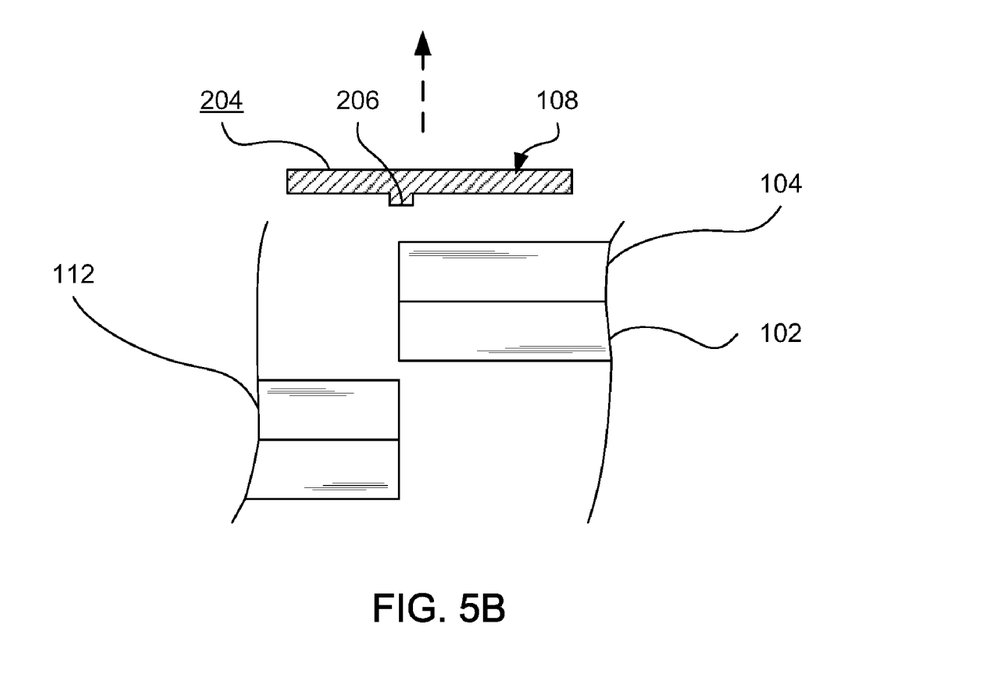
FIG. 5B shows a welded top and bottom separator sheet, a cross section of a cutting and welding tool, and scrap, according to one embodiment of the present subject matter.

With regard to pressure, in various embodiments, the cutting and welding tool is subjected to a single force vector extending orthogonally into the top sheet. FIGS. 5A-5B show a top 104 and bottom 102 separator sheet and a cross section of a cutting and welding tool 108, according to one embodiment of the present subject matter. In various embodiments, the cutting and welding tool subjects a varied pressure 502 (illustrated with vectors) on the top sheet 104 to which it is incident. The illustrated varied pressure 502 is for explanation only, and other pressure configurations are possible. Additionally, alternate force vector configurations are possible as well. The example illustrates a high pressure area proximal the protrusion 206, and a lower pressure area proximal the elongate surface 204 of the cutting and welding tool 108.

This variable pressure achieves various results. One result is that the low pressure areas are not cut. These areas are welded, in various embodiments. Another result is that an excise occurs proximal the protrusion 206. An excised top and bottom sheet are illustrated in FIG. 5B. The illustration shows scrap 112. Overall, in various embodiments, by heating the cutting and welding tool while providing a force input, a weld and excise are performed.

In various embodiments, because of the combination of pressure and heat energy for cutting and welding, the size and shape of the protrusion is important. As such, various methods are employed to control the distance the protrusion extends away from the elongate surface 204 of the cutting and welding tool 108. In various embodiments, the protrusion is defined by laser cutting the cutting and welding tool. In additional embodiments, the protrusion is defined by machining the cutting and welding tool. In additional embodiments, the protrusion is defined by photochemical etching the cutting and welding tool.

Figure 6:
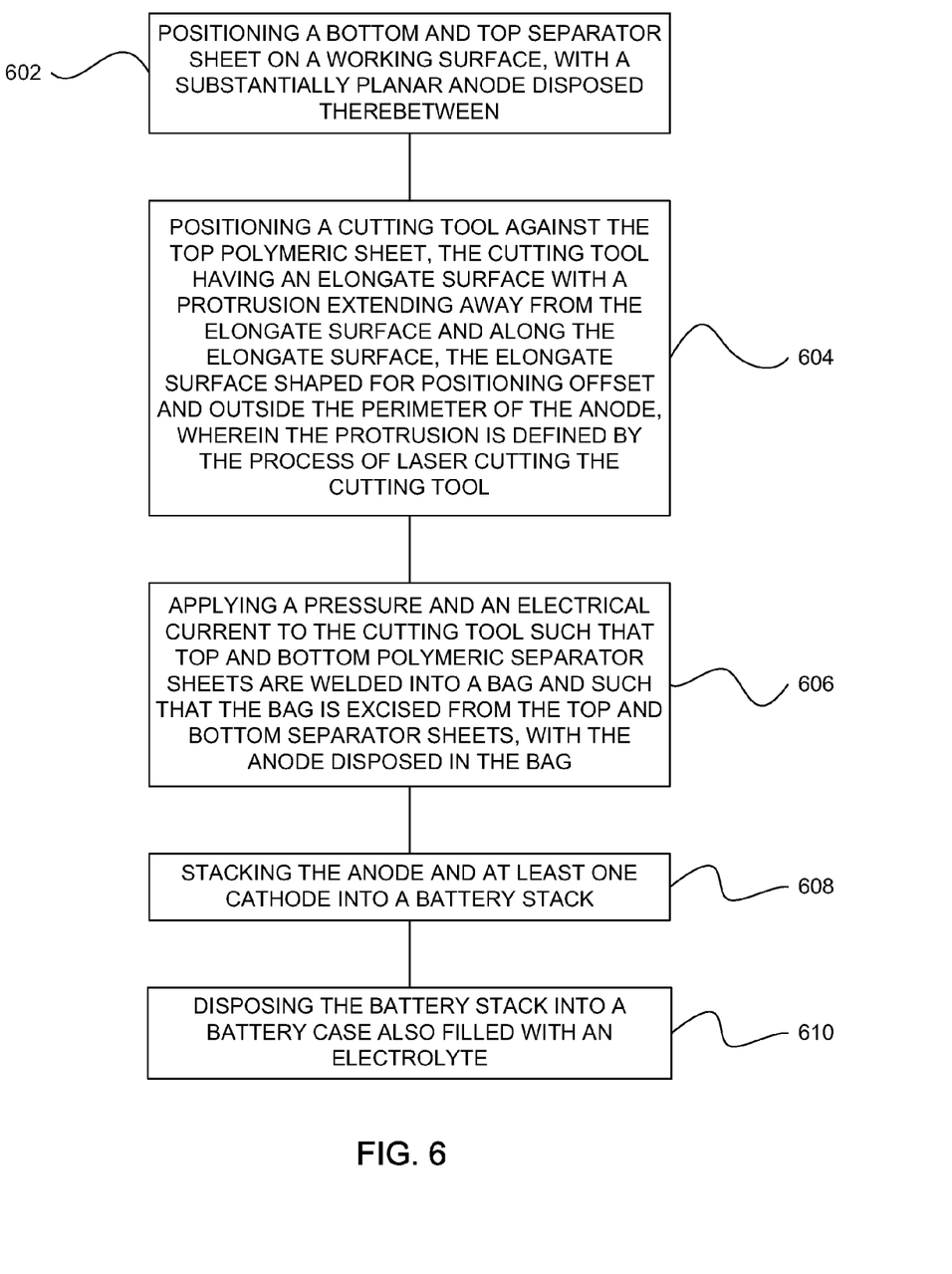
FIG. 6 is a method for cutting and welding separator sheets, according to one embodiment of the present subject matter.

FIG. 6 is a method for cutting and welding separator sheets, according to one embodiment of the present subject matter. In various embodiments, the method includes positioning a bottom and top separator sheet on a working surface 602, with a substantially planar anode disposed therebetween. Additionally, in various embodiments the method includes positioning a cutting tool against the top polymeric sheet 604, the cutting tool having an elongate surface with a protrusion extending away from the elongate surface and along the elongate surface, the elongate surface shaped for positioning offset and outside the perimeter of the anode, wherein the protrusion is defined by laser cutting the cutting tool. In various embodiments the method includes applying a pressure and an electrical current to the cutting tool 606 such that top and bottom polymeric separator sheets are welded into a bag and such that the bag is excised from the top and bottom separator sheets, with the anode disposed in the bag. Some embodiments include stacking the anode and at least one cathode into a battery stack 608. Additionally, some embodiments include disposing the battery stack into a battery case filled with an electrolyte 610.

APPLICATION

In various embodiments, the present subject matter includes stacking a battery anode at least partially enveloped by a separator bag into a battery stack. In various embodiments, this includes stacking the battery anode with additional battery anodes. In further embodiments, this includes stacking cathodes with the battery anode.

Various embodiments of the present subject matter dispose the battery stack into a battery case. In various embodiments, the battery case has at least one feedthrough. In some embodiments, a first terminal connected to the battery stack through the at least one feedthrough. Various embodiments additionally fill the battery case with an electrolyte. In various embodiments, the electrolyte is an organic compound.

Various embodiments additionally include positioning the battery case, along with pulse generation electronics connected to the battery case, into a hermetically sealed housing having a first opening sized for passage of the battery case and pulse generation electronics, with a housing lid sealably conformed to the first opening.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed:

1. A method, comprising:
   positioning a bottom and top polymeric separator sheet on a working surface, with a substantially planar battery anode disposed therebetween;
   positioning a cutting and welding tool that is conductive against the top polymeric sheet, the cutting and welding tool having an elongate surface facing the top polymeric sheet, with a conductive protrusion extending away from the elongate surface, the protrusion at least partially defined by a laser cut and extending toward the top polymeric sheet and along the elongate surface so that it extends around the substantially planar battery anode, the elongate surface shaped for positioning the protrusion offset from and outside of a perimeter of the substantially planar battery anode;
   applying a pressure and an electrical current to the cutting and welding tool such that top and bottom polymeric separator sheets are welded into a bag along a path between the protrusion and the substantially planar battery anode, with the weld comprising a seal to resist ionic transfer through electrolyte, and such that the bag is excised from the top and bottom separator sheets along a path defined by the protrusion, with the substantially planar battery anode disposed in the bag;

stacking the substantially planar battery anode and at least one cathode into a battery stack; and disposing the battery stack into a battery case having at least one feedthrough, with a first terminal connected to the battery stack through the at least one feedthrough, and with the battery case filled with an electrolyte.

2. The method of claim 1, further comprising positioning the battery case, along with pulse generation electronics connected to the battery case, in a hermetically sealed housing having a first opening sized for passage of the battery case and pulse generation electronics, with a housing lid sealably conformed to the first opening.

3. The method of claim 1, wherein the top and bottom polymeric separator sheets include a microporous membrane having a polyethylene layer disposed between two polypropylene layers.

4. The method of claim 1, wherein the bag is defined by a weld extending partially around the substantially planar battery anode.

5. The method of claim 4, wherein a tab portion of the substantially planar battery anode extends outside the bag.

6. The method of claim 1, wherein the electrical current is supplied by a thermal impulse sealer.

7. The method of claim 6, wherein the protrusion has a rectangular cross section.

8. A method, comprising:

positioning a bottom and top polymeric separator sheet on a working surface, with a substantially planar battery anode disposed therebetween;

positioning a cutting and welding tool that is conductive against the top polymeric sheet, the cutting and welding tool having an elongate surface facing the top polymeric sheet, with a conductive protrusion extending away from the elongate surface, the protrusion extending toward the top polymeric sheet and along the elongate surface so that it extends around the substantially planar battery anode, the elongate surface shaped for positioning the protrusion offset from and outside of a perimeter of the substantially planar battery anode;

applying a pressure and an electrical current to the cutting and welding tool such that top and bottom polymeric separator sheets are welded into a bag along a path between the protrusion and the substantially planar battery anode, with the weld comprising a seal to resist ionic transfer through electrolyte, and such that the bag is excised from the top and bottom separator sheets along a path defined by the protrusion, with the substantially planar battery anode disposed in the bag;

stacking the substantially planar battery anode and at least one cathode into a battery stack; and disposing the battery stack into a battery case having at least one feedthrough, with a first terminal connected to the battery stack through the at least one feedthrough, and with the battery case filled with an electrolyte.

9. The method of claim 8, wherein the protrusion is defined by machining the cutting and welding tool.

10. The method of claim 9, further comprising positioning the battery case, along with pulse generation electronics connected to the battery case, in a hermetically sealed housing having a first opening sized for passage of the battery case and pulse generation electronics, with a housing lid sealably conformed to the first opening.

11. The method of claim 9, wherein the bag is defined by a weld extending partially around the substantially planar battery anode.

12. The method of claim 8, wherein the protrusion is defined by laser cutting the cutting and welding tool.

13. The method of claim 12, further comprising positioning the battery case, along with pulse generation electronics connected to the battery case, in a hermetically sealed housing having a first opening sized for passage of the battery case and pulse generation electronics, with a housing lid sealably conformed to the first opening.

14. The method of claim 12, wherein the bag is defined by a weld extending partially around the substantially planar battery anode.

15. The method of claim 8, further comprising positioning the battery case, along with pulse generation electronics connected to the battery case, in a hermetically sealed housing having a first opening sized for passage of the battery case and pulse generation electronics, with a housing lid sealably conformed to the first opening.

16. The method of claim 8, wherein the top and bottom polymeric separator sheets include a microporous membrane having a polyethylene layer disposed between two polypropylene layers.

17. The method of claim 8, wherein the bag is defined by a weld extending partially around the substantially planar battery anode.

18. The method of claim 17, wherein a tab portion of the substantially planar battery anode extends outside the bag.

19. The method of claim 8, wherein the electrical current is supplied by a thermal impulse sealer.

20. The method of claim 19, wherein the protrusion has a rectangular cross section.

* * * * *